US009896081B2

(12) United States Patent
Kondo et al.

(10) Patent No.: US 9,896,081 B2
(45) Date of Patent: Feb. 20, 2018

(54) TRAVEL CONTROL DEVICE (71) Applicant: TOYOTA JIDOSHA KABUSHIKI KAISHA, Toyota-shi (JP)

(72) Inventors: Masami Kondo, Niwa-gun (JP); Takahiro Yokokawa, Susono-shi (JP); Youhei Hareyama, Gotenba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 91 days.

(21) Appl. No.: 14/820,710

(22) Filed: Aug. 7, 2015

(65) Prior Publication Data
US 2016/0052504 A1    Feb. 25, 2016

(30) Foreign Application Priority Data

Aug. 22, 2014   (JP) .................................. 2014-169707

(51) Int. Cl.
*B60W 30/06*     (2006.01)
*B60W 30/18*     (2012.01)
(Continued)

(52) U.S. Cl.
CPC .......... *B60W 10/06* (2013.01); *B60W 10/023* (2013.01); *B60W 10/11* (2013.01); *B60W 10/115* (2013.01); *B60W 30/18072* (2013.01); *B60W 30/192* (2013.01); *B60W 2030/1809* (2013.01); *B60W 2030/18081* (2013.01); *B60W 2510/0638* (2013.01); *B60W 2710/024* (2013.01); *B60W 2710/06* (2013.01); *F02N 5/04* (2013.01); *F02N 15/02* (2013.01); *Y02T 10/48* (2013.01)

(58) Field of Classification Search
CPC ......... B60W 30/18072; B60W 30/192; B60W 10/06; B60W 10/115; F02N 15/02
See application file for complete search history.

(56) References Cited

U.S. PATENT DOCUMENTS 9,156,469 B2 * 10/2015 Gibson ................. B60W 20/40
9,200,701 B2 * 12/2015 Sekii ................... F16H 61/0213
9,421,977 B2 *  8/2016 Kuroki ................. F02D 41/045

FOREIGN PATENT DOCUMENTS

JP       2012-172578       9/2012
JP       2014-98421        5/2014

* cited by examiner

*Primary Examiner* — Jacob S. Scott
*Assistant Examiner* — Tinh Dang
(74) *Attorney, Agent, or Firm* — Oblon, McClelland, Maier & Neustadt, L.L.P.

(57) ABSTRACT

A travel control device includes: an engine; an automatic transmission including a plurality of engagement elements and a rotary element, the automatic transmission being configured to block power transmission between the engine and a drive wheel of a vehicle and set a transmission gear ratio in accordance with an engagement element to be engaged out of the plurality of engagement elements; and a controller configured to perform free-running by blocking power transmission between the engine and the drive wheel while traveling at a predetermined transmission gear ratio and stopping the engine. The controller is configured to increase speed of a rotary element inside the automatic transmission during the free-running, and start the engine at a time speed of the engine becomes higher than a predetermined speed at a time of returning from the free-running.

2 Claims, 10 Drawing Sheets (51) Int. Cl.
*F02N 15/02* (2006.01)
*B60W 10/06* (2006.01)
*B60W 10/02* (2006.01)
*B60W 10/11* (2012.01)
*B60W 10/115* (2012.01)
*B60W 30/192* (2012.01)
*F02N 5/04* (2006.01)

|  | C11 | C12 | B11 | B12 | B13 |
|---|---|---|---|---|---|
| 1st | O |  |  | O |  |
| 2nd | O |  | O |  |  |
| 3rd | O |  |  |  | O |
| 4th | O | O |  |  |  |
| 5th |  | O |  |  | O |
| 6th |  | O | O |  |  |
| CLUTCH | C | A | B |  | D |

|  | C21 | C22 | C23 | C24 | B21 | B22 |
|---|---|---|---|---|---|---|
| 1st | O |  |  |  |  | O |
| 2nd | O |  |  |  | O |  |
| 3rd | O |  | O |  |  |  |
| 4th | O |  |  | O |  |  |
| 5th | O | O |  |  |  |  |
| 6th |  | O |  | O |  |  |
| 7th |  | O | O |  |  |  |
| 8th |  | O |  |  | O |  |
| CLUTCH | C | A | D |  | B |  |

TRAVEL CONTROL DEVICE

CROSS-REFERENCE TO RELATED APPLICATION(S)

The present application claims priority to and incorporates by reference the entire contents of Japanese Patent Application No. 2014-169707 filed in Japan on Aug. 22, 2014.

BACKGROUND OF THE INVENTION

1. Field of the Invention

The present invention relates to a vehicle travel control device.

2. Description of the Related Art

There has been disclosed a technology in which a vehicle is coasted by blocking power transmission between an engine and a drive wheel by using a clutch during travel and stopping the engine. Such coasting is also referred to as free-running. Conventionally, there has been disclosed a technology in which the engine is rotated and started by power transmitted from the drive wheel without actuating a starter when restarting the engine during free-running (refer to Japanese Patent Application Laid-open No. 2012-172578). The method of thus rotating and starting the engine with the power transmitted from the drive wheel is also referred to as push-starting.

However, when push-starting, inertial torque of the drive wheel is utilized to rotate the engine. Therefore, output torque to the drive wheel drops and may cause deceleration.

There is a need for a travel control device which prevents occurrence of deceleration caused by the push-starting during the free-running.

SUMMARY OF THE INVENTION

It is an object of the present invention to at least partially solve the problems in the conventional technology.

A travel control device may include: an engine; an automatic transmission including a plurality of engagement elements and a rotary element, the automatic transmission being configured to block power transmission between the engine and a drive wheel of a vehicle and set a transmission gear ratio in accordance with an engagement element to be engaged out of the plurality of engagement elements; and a controller configured to: perform free-running by blocking power transmission between the engine and the drive wheel while traveling at a predetermined transmission gear ratio and stopping the engine; increase speed of a rotary element inside the automatic transmission, during the free-running, by engaging at least one of engagement elements excluding an engagement element to be engaged at the predetermined transmission gear ratio in a state that all of the engagement elements to be engaged at the predetermined transmission gear ratio are disengaged; and disengage, at a time of returning from the free-running, the engaged engagement element, engage an engagement element to transmit, to the engine, at least rotational energy of the rotary element having the increased speed out of the engagement elements to be engaged at a transmission gear ratio after returning, and start the engine at a time speed of the engine becomes higher than a predetermined speed.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

In the following, embodiments of a travel control device according to the present invention will be described in detail with reference to the drawings. Note that the present invention is not limited by the embodiments. Further, in the drawings, a component same or equivalent is conveniently denoted by the same reference sign, and repetition of the same description will be omitted.

First Embodiment

Figure 1:
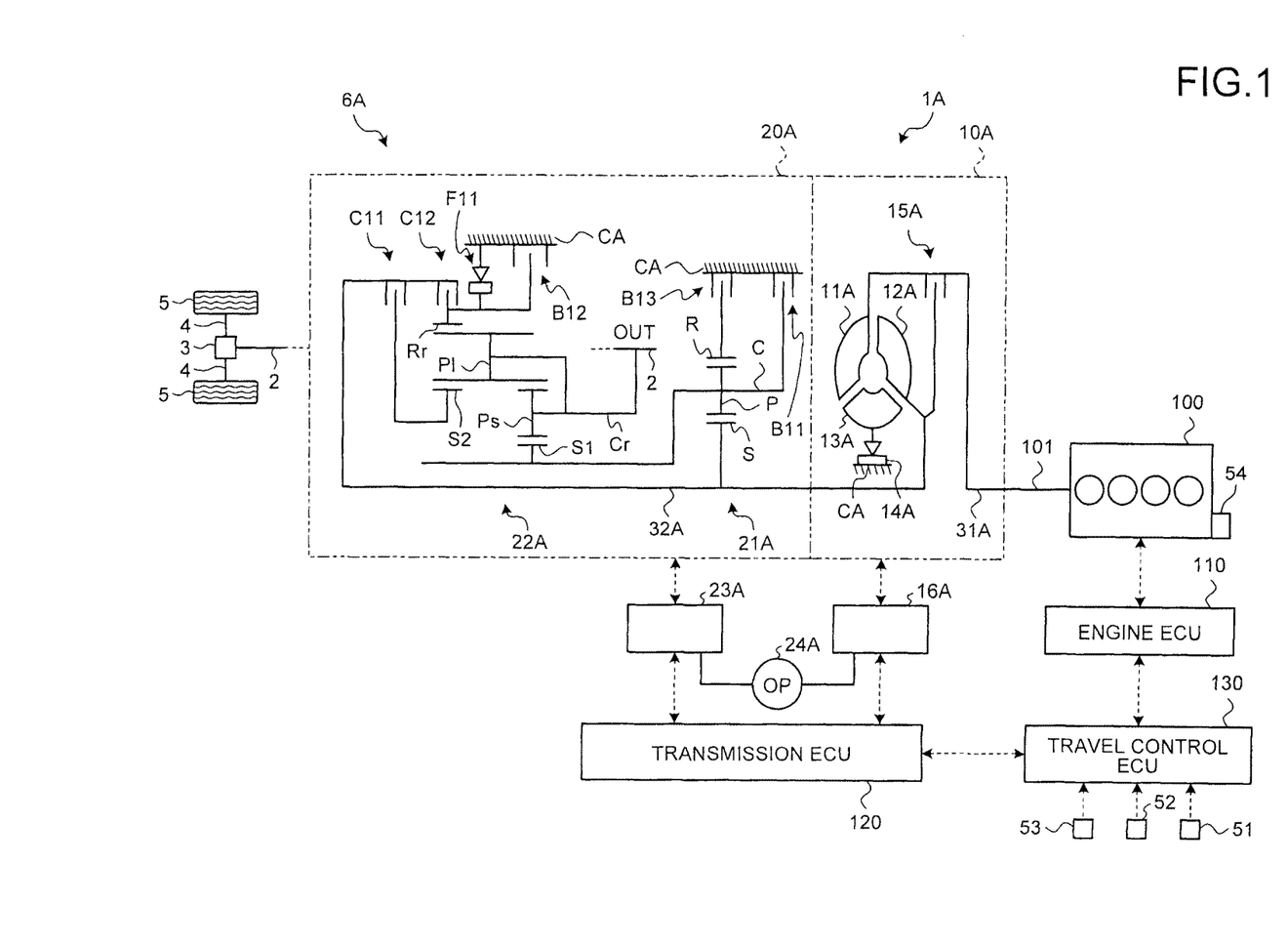
FIG. 1 is a schematic configuration diagram of a vehicle mounted with a travel control device according to a first embodiment.

FIG. 1 is a schematic configuration diagram of a vehicle mounted with a travel control device according to a first embodiment. As illustrated in FIG. 1, a vehicle 1A includes an engine 100, an output shaft 2, a differential gear 3, right and left drive shafts 4, right and left drive wheels 5, an automatic transmission 6A, an engine electronic control Unit (ECU) 110, a transmission ECU 120, a travel control ECU 130, hydraulic actuators 16A, 23A, an oil pump 24A, a vehicle speed sensor 51, an accelerator position sensor 52, a brake sensor 53, and a crank angle sensor 54.

The engine 100 converts combustion energy of fuel to rotational motion of an output shaft 101, and outputs the same.

The automatic transmission 6A is an automatic transmission provided with 6-speed forward, and includes a torque converter 10A and a transmission body 20A.

The torque converter 10A includes a pump impeller 11A, a turbine runner 12A, and a stator 13A housed inside a housing CA of the automatic transmission 6A, and transmits output torque of the engine 100 to the transmission body 20A. The pump impeller 11A is connected to an input shaft 31A of the automatic transmission 6A so as to be integrally rotatable. The input shaft 31A is connected to the output shaft 101 of the engine 100. The turbine runner 12A is connected to an intermediate shaft 32A so as to be integrally rotatable. The turbine runner 12A is connected to the transmission body 20A via the intermediate shaft 32A. The stator 13A is connected to the housing CA via a one-way clutch 14A.

A lock-up clutch 15A is disposed in the torque converter 10A. The lock-up clutch 15A is a hydraulically-driven engagement element (frictional engagement element) including a first engagement portion capable of rotating integrally with the input shaft 31A, and a second engagement portion capable of rotating integrally with the intermediate shaft 32A. The lock-up clutch 15A rotates the pump impeller 11A integrally with the turbine runner 12A when engaged.

The transmission body 20A is formed including a first planetary unit 21A, a second planetary unit 22A, and a plurality of engagement elements inside a housing CA. The plurality of engagement elements includes a first clutch C11, a second clutch C12, a first brake B11, a second brake B12, and a third brake B13. The transmission body 20A can execute switching and setting to a requested transmission gear ratio by engaging or disengaging the engagement elements in accordance with the requested transmission gear ratio between the input and output. Note that the transmission body 20A also includes a one-way clutch F11.

The first planetary unit 21A is a single pinion type planetary gear train and includes, as a plurality of rotary elements capable of differential rotation, a sun gear S, a ring gear R, a plurality of pinion gears P, and a carrier C. The second planetary unit 22A is a Ravigneaux-type planetary gear train and includes, as a plurality of rotary elements capable of differential rotation, a first sun gear S1, a second sun gear S2, a ring gear Rr, a plurality of long pinion gears Pl to be engaged with the second sun gear S2 and the ring gear Rr, a plurality of short pinion gears Ps to be engaged with the first sun gear S1 and the long pinion gears Pl, and a carrier Cr to hold each of the long pinion gears Pl and each of the short pinion gears Ps. In the transmission body 20A, the carrier C of the first planetary unit 21A and the first sun gear S1 of the second planetary unit 22A are connected so as to be integrally rotated. The torque received in the automatic transmission 6A is output from the carrier Cr of the second planetary unit 22A and transmitted to the right and left drive wheels 5 via the output shaft 2, differential gear 3, and right and left drive shafts 4.

The first clutch C11 includes a first engagement portion capable of rotating integrally with the second sun gear S2 of the second planetary unit 22A, and a second engagement portion capable of rotating integrally with the sun gear S of the first planetary unit 21A, and the intermediate shaft 32A. More specifically, the first clutch C11 is a frictional engagement device in which a friction material is included in one of the first engagement portion and the second engagement portion, and engagement operation and disengagement operation between the first engagement portion and the second engagement portion are hydraulically controlled. The second clutch C12 is a frictional engagement device same as the first clutch C11. The second clutch C12 includes a first engagement portion capable of rotating integrally with the ring gear Rr of the second planetary unit 22A, and a second engagement portion capable of rotating integrally with the sun gear S of the first planetary unit 21A, and the intermediate shaft 32A. Therefore, the second engagement portion of the second clutch C12 can rotate integrally with the second engagement portion of the first clutch C11. The one-way clutch F11 is disposed between the ring gear Rr of the second planetary unit 22A and the housing CA. The one-way clutch F11 brings the ring gear Rr of the second planetary unit 22A in a rotation stopped state or a rotatable state.

The first brake B11, second brake B12, and third brake B13 are hydraulically-driven frictional engagement devices same as the first clutch C11 and the like. The first brake B11 includes a first engagement portion capable of rotating integrally with the carrier C of the first planetary unit 21A, and a second engagement portion fixed to the housing CA. The second brake B12 includes a first engagement portion capable of rotating integrally with the ring gear Rr of the second planetary unit 22A, and a second engagement portion fixed to the housing CA. The third brake B13 includes a first engagement portion capable of rotating integrally with the ring gear R of the first planetary unit 21A, and a second engagement portion fixed to the housing CA.

Figure 2A:
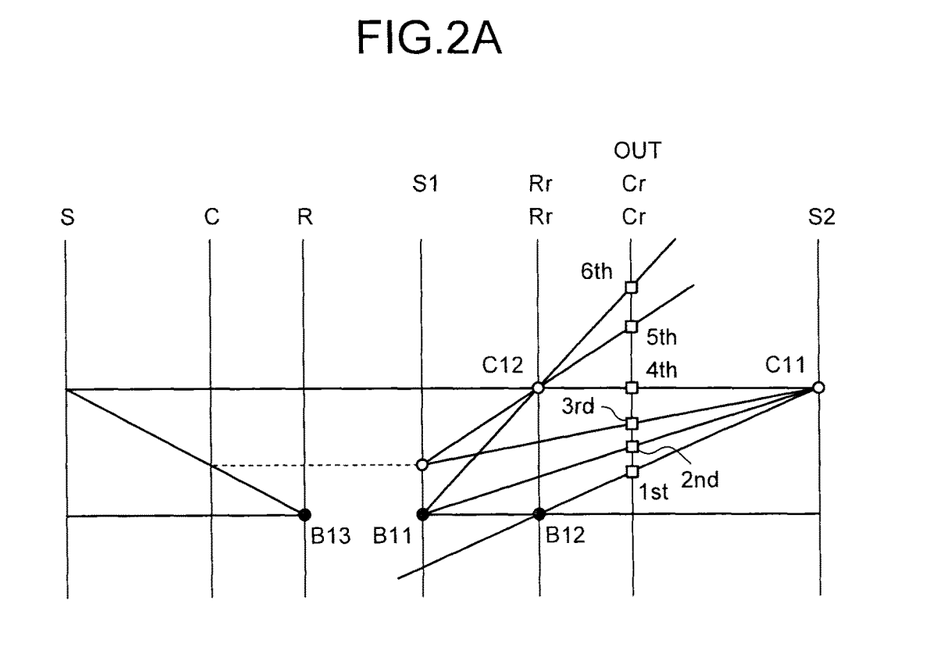
FIGS. 2A and 2B are diagrams illustrating a collinear chart per variable speed range of an automatic transmission and a table showing operative engagement.
Figure 2B:
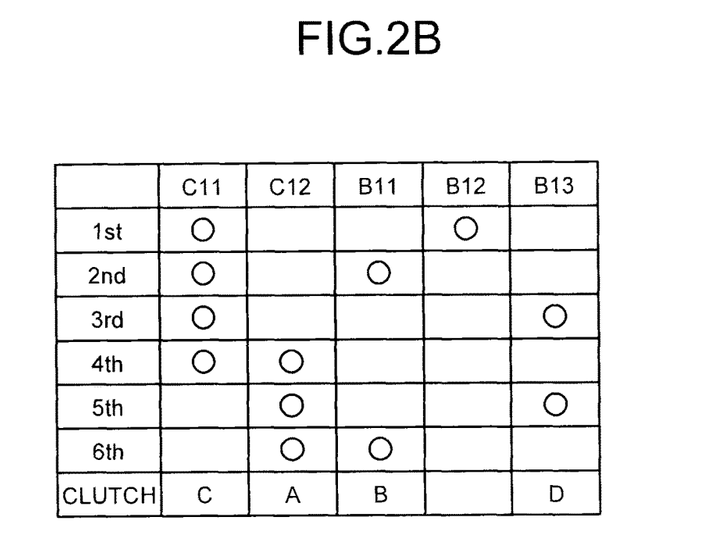

FIG. 2A is a collinear chart (speed diagram) per variable speed range of the automatic transmission 6A, and FIG. 2B is an operative engagement table per variable speed range of the first clutch C11, second clutch C12, first brake B11, second brake B12, and third brake B13. In the operative engagement table, a circle indicates an engaged state, and a blank indicates a disengaged state. Further, "1st", "2nd", "3rd", "4th", "5th", and "6th" respectively represent transmission gear ratios from 1st gear range to 6th gear range in a forward range D. For example, when the transmission gear ratio is 1st gear range, the first clutch C11 and the second brake B12 are engaged respectively. Further, for the sake of convenience in the later description, the second clutch C12 may be referred to as a clutch A, the first brake B11 as a clutch B, first clutch C11 as a clutch C, and the third brake B13 as a clutch D as illustrated in the operative engagement table of FIG. 2B.

The description returns to FIG. 1. The hydraulic actuator 16A is hydraulically operated, and controls engagement operation and disengagement operation of the lock-up clutch 15A. The hydraulic actuator 23A is hydraulically operated, and controls engagement operation and disengagement operation of the first clutch C11, second clutch C12, first brake B11, second brake B12, and third brake B13. The oil pump 24A supplies hydraulic oil with hydraulic pressure to actuate the hydraulic actuators 16A, 23A. Power of oil pump 24A is supplied to an electric motor to be driven by rotative force of the engine 100 or by a battery.

The vehicle speed sensor 51 detects travel speed of the vehicle 1A. The accelerator position sensor 52 detects an accelerator position according to a pressing amount of an accelerator pedal by a driver as well as whether the accelerator is on or off. The brake sensor 53 detects whether the brake is on or off according to the pressing amount of a brake pedal by the driver. The vehicle speed sensor 51, accelerator position sensor 52, and brake sensor 53 are electrically connected to the travel control ECU 130 so as to output respective detection results to the travel control ECU 130. The crank angle sensor 54 is disposed at a crank shaft of the engine 100 in order to detect a crank angle used to calculate engine speed. The crank angle sensor 54 is electrically connected to the engine ECU 110 so as to output a detection result to the engine ECU 110.

The engine ECU 110, transmission ECU 120, and travel control ECU 130 are electronic circuits mainly formed of a known microcomputer physically including a central processing unit (CPU), random access memory (RAM), read only memory (ROM), and an interface such as input and output. The ECUs have functions implemented by operating a control object under the control of the CPU by loading, in the RAM, an application program held in the ROM and executing the program in the CPU, and further by reading and writing data in the RAM and ROM. Further, the engine ECU 110, transmission ECU 120, and travel control ECU 130 are configured to communicate one another, and transmit and receive various kinds of commands and detection results of the various kinds of sensors.

The engine ECU 110 controls, for the engine 100, a fuel injection amount and injection timing by an injector, and ignition timing by an ignition plug.

The transmission ECU 120 outputs a control signal to the hydraulic actuators 16A, 23A based on the detection results of the vehicle speed and accelerator position. The hydraulic actuators 16A, 23A control the automatic transmission 6A based on the control signal. The speed of the automatic transmission 6A is thus changed.

The travel control ECU 130 controls a travel mode of the vehicle 1A. In the first embodiment, the travel control ECU 130 is configured to perform free-running as the travel mode. For example, when the accelerator is turned off during travel and also the brake is off, the travel control ECU 130 outputs a control signal to perform the free-running, and blocks power transmission between the engine 100 and the drive wheel 5, and further stops the engine 100. The vehicle 1A thus performs coasting travel. A travel control device according to the first embodiment is implemented by a configuration including the travel control ECU 130, or including the engine ECU 110, transmission ECU 120, and travel control ECU 130.

Here, as described above, in the case of performing push-starting by rotating the engine 100 with power transmitted from the drive wheel 5 at the time of restarting the engine 100 during the free-running, deceleration may occur because inertial torque of the drive wheel 5 is used to rotate the engine 100.

In contrast, according to the first embodiment, the travel control device causes the vehicle 1A to perform the free-running while the vehicle is traveling at a predetermined transmission gear ratio, and further engages at least one of the engagement elements excluding an engagement element to be engaged at the predetermined transmission gear ratio in a state that all of the engagement elements to be engaged at the predetermined transmission gear ratio are disengaged during the free-running, thereby increasing speed of a rotary element inside the automatic transmission 6A. Here, the rotary element inside the automatic transmission 6A represents a rotary element not connected to the engine 100. Further, at the time of returning from the free-running, the travel control device disengages the engagement element being engaged, and further engages an engagement element to transmit, to the engine 100, rotational energy of the rotary element having the increased speed out of the engagement elements to be engaged at the transmission gear ratio after returning. After that, when the speed of the engine 100 becomes higher than a predetermined speed, the engine 100 is started. By this, the rotational energy of the rotary element having the speed increased during the free-running is diverted to engine starting torque. Therefore, occurrence of deceleration caused by the push-starting during the free-running can be prevented.

Figure 3:
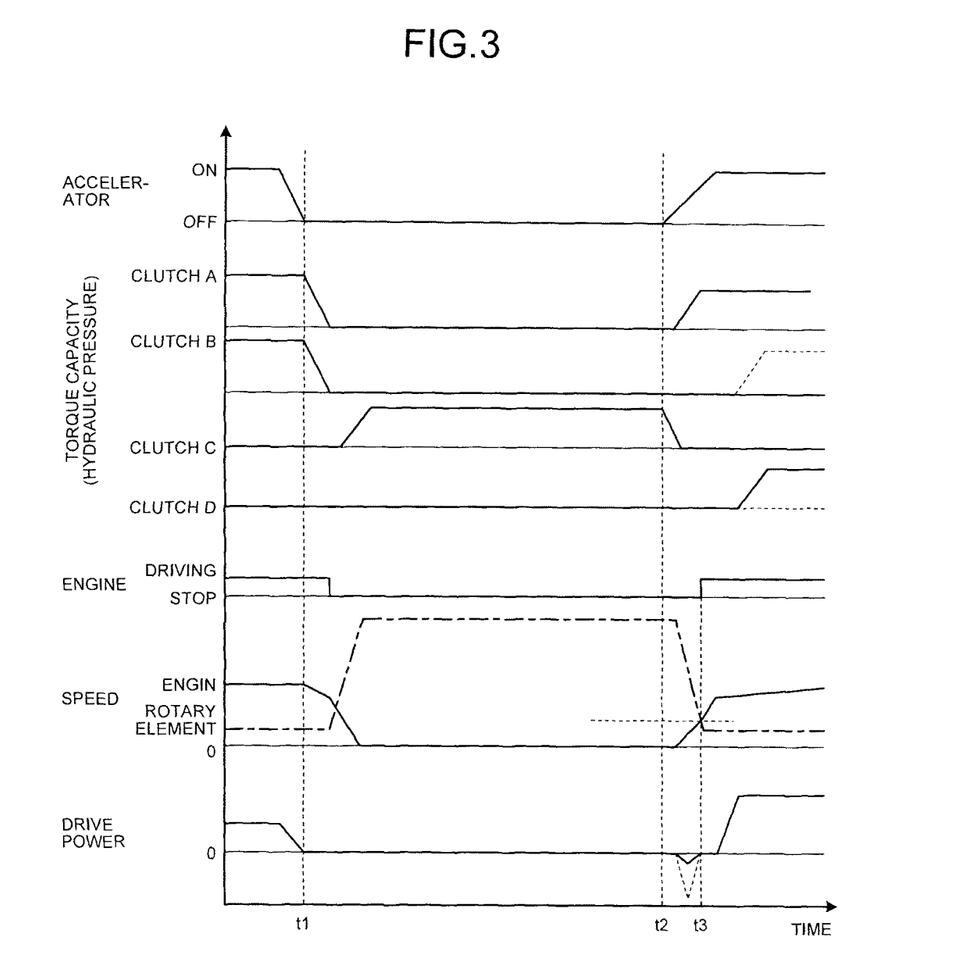
FIG. 3 is a time chart illustrating an example of control according to the first embodiment.

In the following, an example of control according to the first embodiment will be specifically described by using a time chart illustrated in FIG. 3. The time chart illustrated in FIG. 3 illustrates a case in which the accelerator is turned off while the vehicle 1A is traveling in 6th gear range, and the travel mode shifts to the free-running and then returns from the free-running. In this case, as illustrated in FIG. 2, the engagement elements of the transmission body 20A are in a state that the clutch A (second clutch C12) and the clutch B (first brake B11) are engaged, and other clutches, namely, the clutch C (first clutch C11), clutch D (third brake B13), and second brake B12 are disengaged.

When the accelerator is turned off by the driver at time t1 while traveling in 6th gear range and the brake is off, the travel control device disengages the clutch A and the clutch B by reducing torque capacity (hydraulic pressure) of the clutch A and clutch B which are the engagement elements to be engaged in 6th gear range. Power transmission between the engine 100 and the drive wheel 5 is thus blocked. Note that the above power transmission can be blocked by disengaging at least one of the clutch A and the clutch B. Further, the travel control devices stops the engine 100. The travel control devices thus causes the vehicle 1A to perform the free-running. Note that the speed of the engine 100 is reduced and becomes zero afterward. Further, drive power to be transmitted to the drive wheel 5 becomes zero as well because the accelerator is turned off.

Next, the travel control device increases the speed of the rotary element (e.g., ring gear Rr) inside the automatic transmission 6A higher than before the free-running by engaging the clutch C which is the engagement element excluding engagement elements to be engaged in 6th gear range in a state that all of the engagement elements (clutch A and clutch B) to be engaged in 6th gear range are disengaged during the free-running. The rotational energy of the rotary element having the increased speed is thus increased.

Next, when the accelerator is turned on by the driver at time t2, the travel control device executes control to return from the free-running. At this point, assume that the transmission gear ratio after returning from the free-running is set to 5th gear range in accordance with a preliminarily stored speed change line preset in accordance with the vehicle speed and the accelerator position. Then, the travel control device disengages the clutch C being engaged during the free-running, and further engages, via the intermediate shaft 32A, the clutch A connected to the output shaft 101 of the engine 100 out of the engagement elements (clutch A and clutch D) to be engaged in 5th gear range which is the transmission gear ratio after returning. Then, the rotational energy of the rotary element (e.g., ring gear Rr) having the increased speed is transmitted to the engine 100, and the engine 100 starts rotation. When the speed of the engine becomes higher than the predetermined speed (starting speed of the engine 100) later, the travel control device executes fuel injection by the injector and ignition by the ignition plug k in the engine 100, and starts the engine 100 (time t3). After that, the travel control device engages the clutch D to form 5th gear range.

Here, for example, in the case of returning from the free-running in a state that the clutch D is engaged in order to use the drive power of the drive wheel 5 for push-starting after returning from the free-running, the drive power is temporarily reduced as indicated by a dotted line of the drive power in FIG. 3, and deceleration may occur. Then, the driver feels pull-in feeling of torque and deceleration feeling. However, according to the first embodiment, since reduction of the drive power is prevented as indicated by a solid line of the drive power in FIG. 3, occurrence of deceleration can be prevented.

Note that, in the above-described example, the transmission gear ratio after returning from the free-running is set to 5th gear range in accordance with the speed change line. Therefore, the clutch D to be engaged in 5th gear range is engaged after starting the engine. However, when the transmission gear ratio after returning from the free-running is set to 6th gear range in accordance with the speed change line, the clutch D is not engaged and the clutch B to be engaged in 6th gear range is engaged as indicated by the dotted line in FIG. 3.

Figure 4:
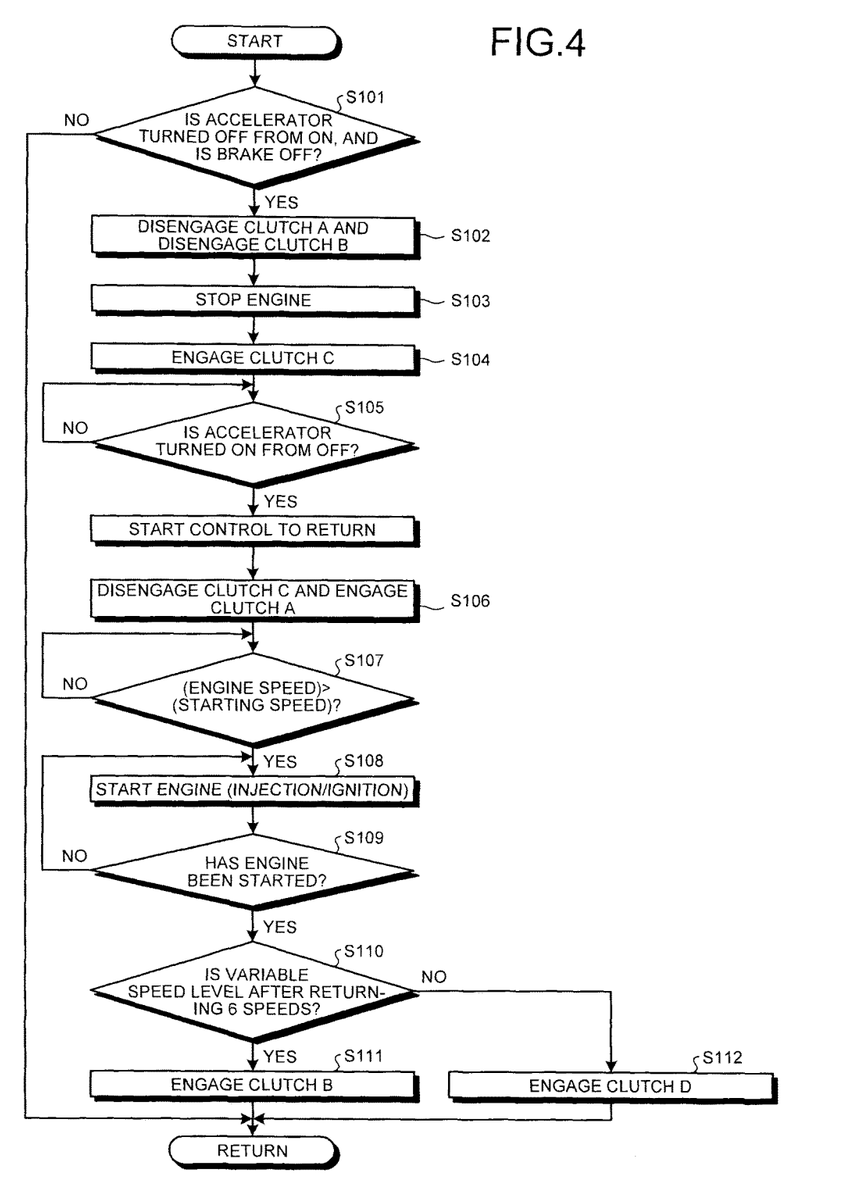
FIG. 4 is a flowchart illustrating an example of control according to the first embodiment.

Next, the example of control illustrated in FIG. 3 will be more specifically described by using a control flow illustrated in FIG. 4 and collinear charts illustrated in FIGS. 5A to 5E.

The travel control device determines, in Step S101, whether the accelerator is turned off from on and the brake is off while traveling in 6th gear range. When the accelerator is not turned off from on or the brake is on (Step S101, No), the control is finished. When the accelerator is turned off from on and the brake is off (Step S101, Yes), the processing proceeds to Step S102.

In Step S102, the travel control device disengages the clutch A and further disengages the clutch B, and the processing proceeds to Step S103. The travel control device stops the engine 100 in Step S103. The free-running is thus started. Note that disengagement of the clutch A and disengagement of the clutch B may be executed at the same time or in an optional order. Further, the engine 100 is stopped after disengaging one of the clutch A and clutch B, and the other one of the clutch A and clutch B may be disengaged after stopping the engine 100.

Figure 5A:
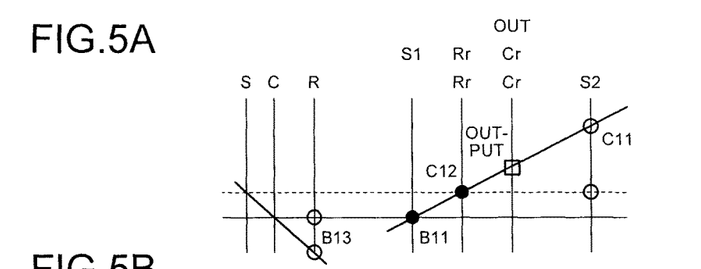
FIGS. 5A to 5E are collinear charts in an example of control according to the first embodiment.
Figures 5B, 5C, 5D:
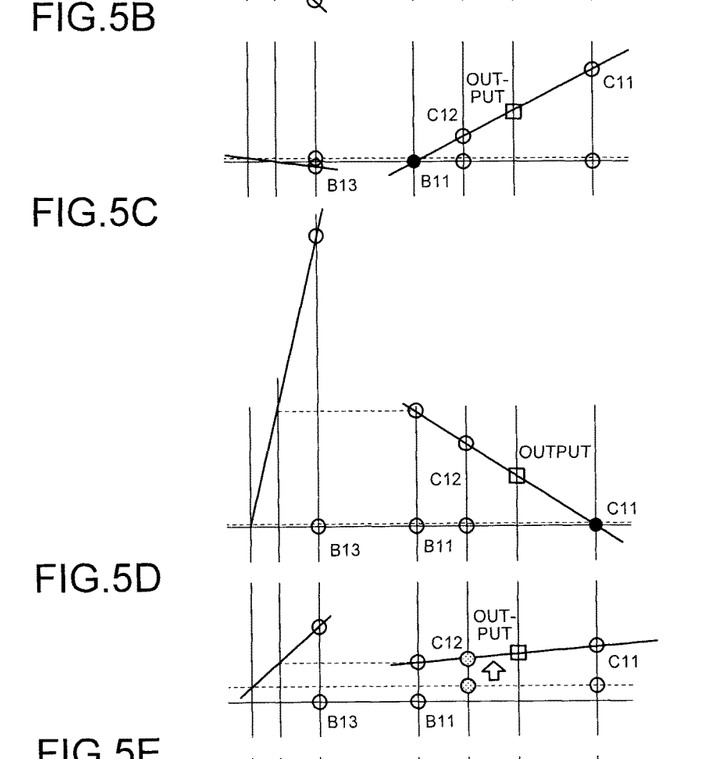
Figure 5E:
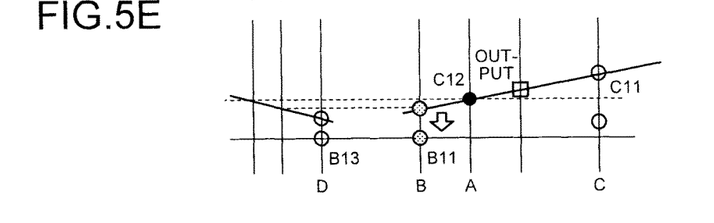

FIG. 5A illustrates a state of traveling in 6th gear range, in which the clutch A (second clutch C12) and the clutch B (first brake B11) are engaged. FIG. 5B illustrates a state in which the clutch A is disengaged and the clutch B is engaged.

Subsequently, in Step S104, the travel control device gradually engages the clutch C (first clutch C11) in a state that all of the engagement elements (clutch A and clutch B) to be engaged in 6th gear range are disengaged.

FIG. 5C illustrates a state in which the clutch C is engaged. As illustrated, the ring gear Rr rotating integrally with the first engagement portion of the clutch C, and the rotary elements, such as the carrier C and the first sun gear S1 rotating integrally with the first engagement portion of the first brake B11, have the speed increased higher than before the free-running.

Next, the travel control device determines whether the accelerator is turned on from off in Step S105. When the accelerator is not turned on from off (Step S105, No), the processing in Step S105 is repeated. When the accelerator is turned on from off (Step S105, Yes), control to return from the free-running is started, and the processing proceeds to Step S106.

Subsequently, the travel control device disengages the clutch C and further engages the clutch A (second clutch C12) in Step S106. Then, as illustrated in FIG. 5D, rotational energy of the ring gear Rr is transmitted to the engine 100, via the intermediate shaft 32A and the second engagement portion engaged with the first engagement portion, from the first engagement portion of the clutch A rotating integrally with the ring gear Rr, and the engine 100 starts rotation. At this point, the speed of the sun gear S is increased.

Subsequently, the travel control device determines whether the engine speed is higher than the starting speed of the engine in Step S107. When the engine speed is the starting speed or lower (Step S107, No), the processing in Step S107 is repeated. When the engine speed is higher than the starting speed (Step S107, Yes), the processing proceeds to Step S108.

Subsequently, the travel control device executes fuel injection by the injector and ignition by the ignition plug to start the engine 100 in Step S108.

Then, the travel control device determines whether the engine 100 has been started in Step S109. When the engine 100 has not been started yet (Step S109, No), the processing in Step S108 is repeated. When the engine 100 has been already started (Step S109, Yes), the processing proceeds to Step S110.

Subsequently, the travel control device determines whether the transmission gear ratio after returning is 6th gear range in Step S110. When the transmission gear ratio after returning is 6th gear range (Step S110, Yes), the processing proceeds to Step S111. In Step S111, the travel control device engages the clutch B (first brake B11) to form 6th gear range (refer to FIG. 5E), and finishes a control routine. Thus, 6th gear range is thus formed. When the transmission gear ratio after returning is not 6th gear range but 5th gear range (Step S110, No), the processing proceeds to Step S112. In Step S112, the travel control device engages the clutch D (third brake B13) to form 5th gear range, and finishes the control routine.

Note that, in the control flow illustrated in FIG. 4, the case has been described, in which the free-running is started while traveling in 6th gear range and the transmission gear ratio after returning from the free-running is 5th gear range or 6th gear range. However, when the variable speed while traveling and the transmission gear ratio after returning from the free-running is other transmission gear ratios, the engagement element to be engaged in Step S104 is an engagement element excluding the engagement element that has been engaged at the transmission gear ratio while traveling. Further, an engagement means to be engaged in Step S106 is an engagement element to transmit, to the engine 100, the rotational energy having the increased speed to the engine 100, for example, the engagement element connected at least to the engine 100 (e.g., in the cases of 1st gear range to 4th gear range, the first clutch C11 as illustrated in FIG. 2B) out of the engagement elements to form the transmission gear ratio after returning. Further, in Step S110, which one of transmission gear ratios is the transmission gear ratio after returning is determined from among the transmission gear ratios that can be formed by the engagement element engaged in the Step S106. In the subsequent Step, remaining engagement elements are engaged in order to form the transmission gear ratio after returning.

Further, in the control flow illustrated in FIG. 4, a step to determine the transmission gear ratio after returning may be added between Step S105 and Step S106, and based on a result thereof, the engagement means to be engaged in Step S106, determination in Step S110, and the engagement element to be engaged in the subsequent Step may be changed.

Next, a different control example according to the present invention will be described by using a time chart illustrated in FIG. 6. The time chart illustrated in FIG. 6 illustrates an example in which the accelerator is turned off while the vehicle 1A travels in 6th gear range, and the travel mode shifts to free-running same as FIG. 3.

Figure 6:
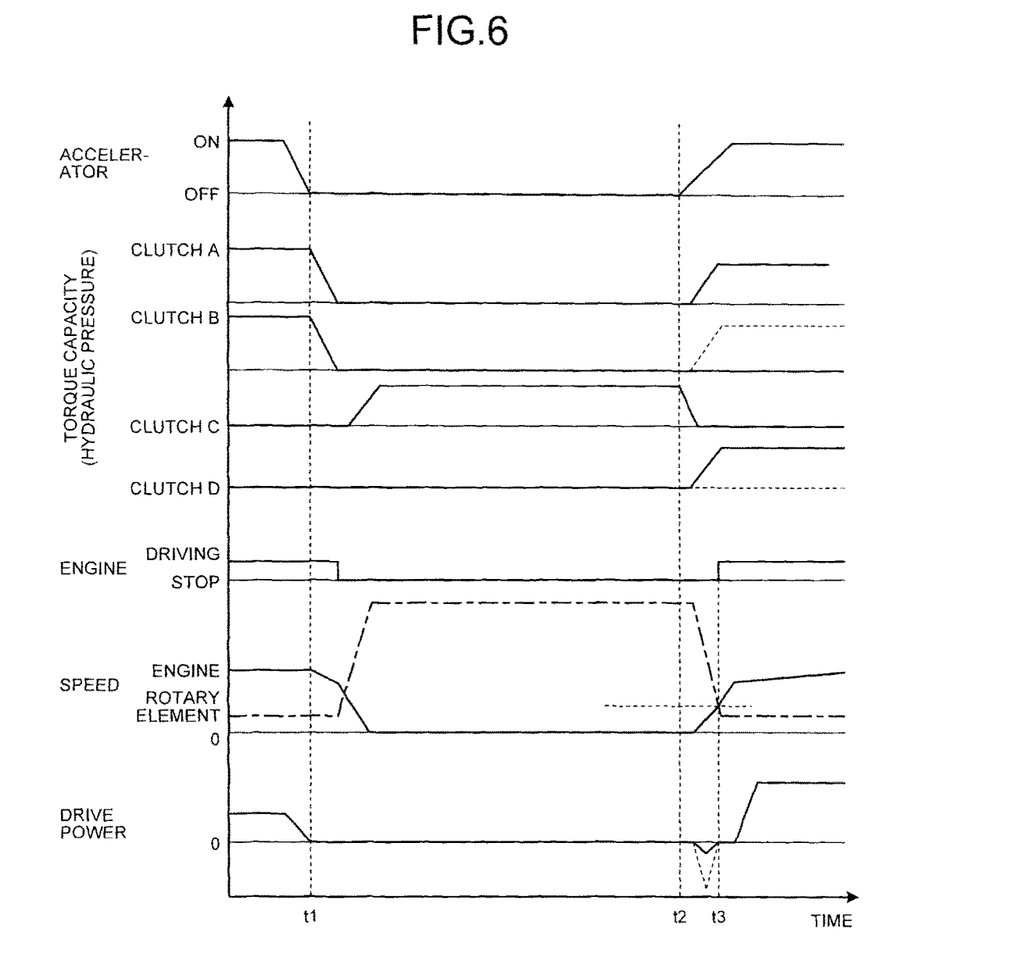
FIG. 6 is a time chart illustrating a different example of control according to the first embodiment.

The time chart illustrated in FIG. 6 is same as the time chart illustrated in FIG. 3 until the time t2. When the accelerator is turned on by the driver at the time t2, control to return from the free-running is executed. At this point, assume that the transmission gear ratio after returning from the free-running is set to 5th gear range in accordance with the preliminarily stored speed change line preset in accordance with the vehicle speed and the accelerator position.

Then, the travel control device disengages the clutch C being engaged during the free-running, and further engages the clutch A and clutch D which are all of the engagement elements to be engaged in 5th gear range which is the transmission gear ratio after returning. Then, the rotational energy of the rotary element (e.g., ring gear Rr) having the increased speed is transmitted to the engine 100, and the engine 100 starts rotation. When the engine speed becomes higher than the starting speed of the engine 100, the travel control device executes fuel injection by the injector and ignition by the ignition plug in the engine 100 to start the engine 100 (timing t3). In this case also, the drive power is prevented from being reduced as indicated by a solid line of the drive power in FIG. 6. Therefore, occurrence of deceleration can be prevented.

Meanwhile, in the above-described example, the transmission gear ratio after returning from the free-running is set to 5th gear range in accordance with the speed change line. Therefore, the clutch A and the clutch D to be engaged in 5th gear range are engaged. However, when the transmission gear ratio after returning from the free-running is set to 6th gear range in accordance with the speed change line, the clutch A and the clutch B to be engaged in 6th gear range are engaged as indicated by a solid line in FIG. 6.

Figure 7:
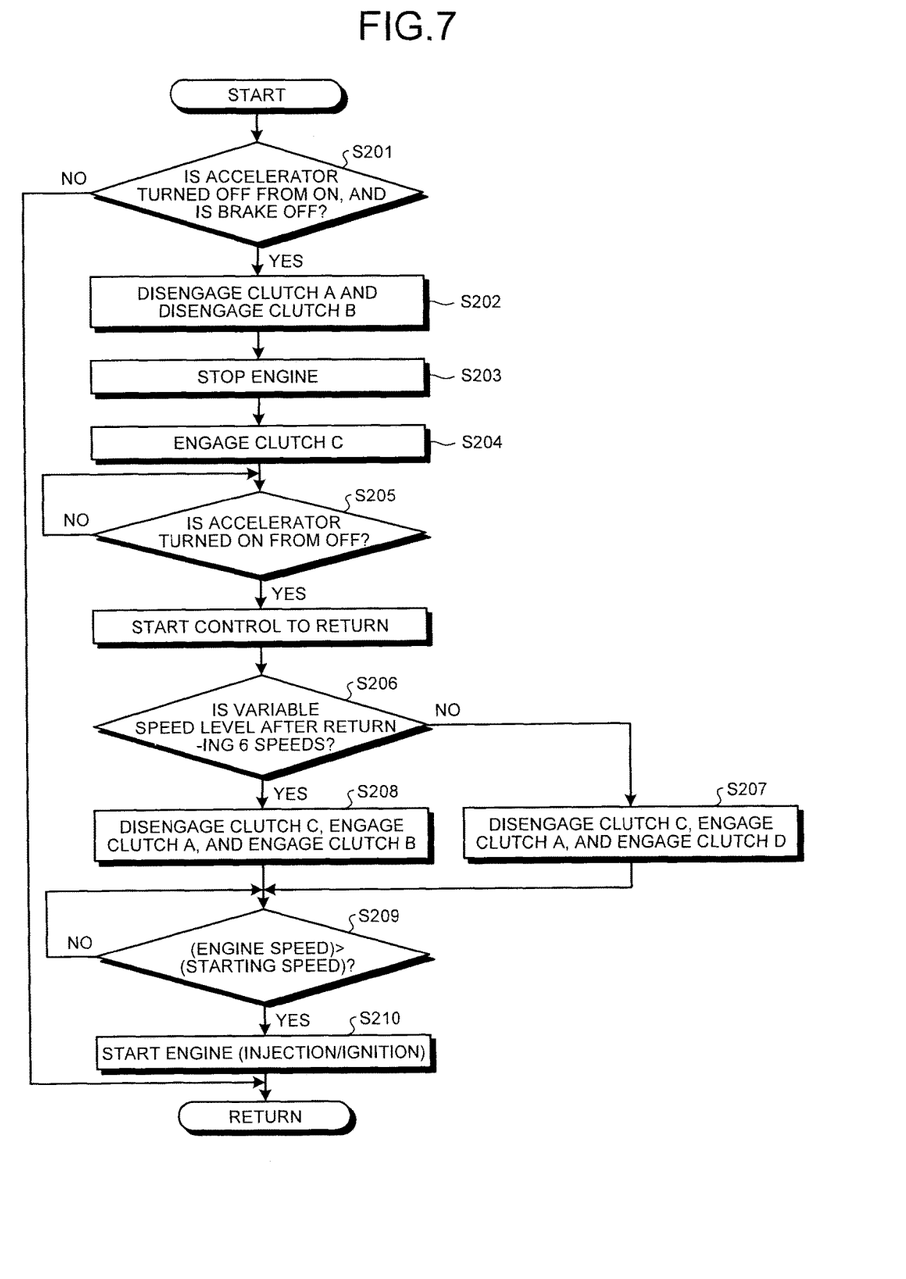
FIG. 7 is a flowchart illustrating a different example of control according to the first embodiment.
Figure 8:
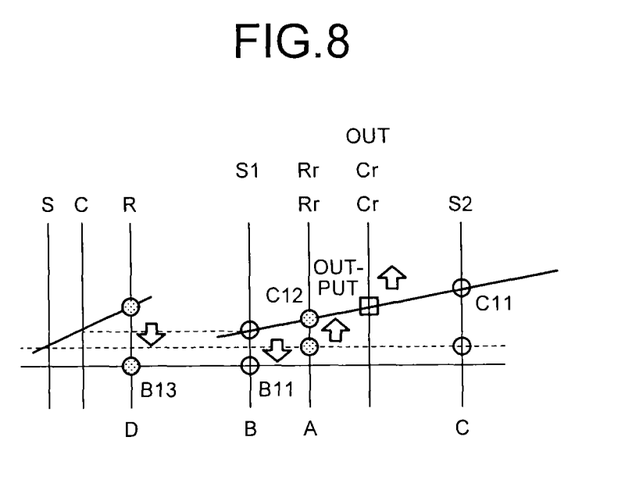
FIG. 8 is a collinear chart in a different example of control according to the first embodiment.

Next, the example of control illustrated in FIG. 6 will be more specifically described by using a control flow illustrated in FIG. 7 and a collinear chart illustrated in FIG. 8.

Since the control flow illustrated in FIG. 7 have Steps S201, S202, S203, S204, and S205 same as the Steps S101, S102, S103, S104, and S105 illustrated in FIG. 4, the description will be omitted.

Subsequently, the travel control device determines whether the transmission gear ratio after returning is 6th gear range in Step S206. When the transmission gear ratio after returning is not 6th gear range but 5th gear range (Step S206, No), the processing proceeds to Step S207. In Step S207, the travel control device disengages the clutch C, and further engages the clutch A (second clutch C12) and the clutch D (third brake B13). Then, as illustrated in FIG. 8, rotational energy of the ring gear Rr is transmitted to the engine 100, via the intermediate shaft 32A and the second engagement portion engaged with the first engagement portion, from the first engagement portion of the clutch A rotating integrally with the ring gear Rr, and the engine 100 starts rotation. Further, since the clutch D is engaged at this point, the speed of the carrier C is reduced, and due to this, the first sun gear S1 is also reduced. Therefore, torque on the acceleration side acts on the output shaft 2 by reaction force thereof. This further reduces pull-in feeling of the torque, and occurrence of deceleration can be further prevented.

Subsequently, the travel control device determines whether the engine speed is higher than the starting speed of the engine in Step S209. When the engine speed is the starting speed or lower (Step S209, No), the processing in Step S209 is repeated. When the engine speed is higher than the starting speed (Step S209, Yes), the processing proceeds to Step S210.

Subsequently, the travel control device executes fuel injection by the injector and ignition by the ignition plug to start the engine 100 in Step S210.

On the other hand, when the transmission gear ratio after returning is 6th gear range (Step S206, Yes), the processing proceeds to Step S208. In Step S208, the travel control device disengages the clutch C, and further engages the clutch A and the clutch B (first brake B11). Then, rotational energy of the ring gear Rr is transmitted to the engine 100, via the intermediate shaft 32A and the second engagement portion engaged with the first engagement portion, from the first engagement portion of the clutch A capable of rotating integrally with the ring gear Rr, and the engine 100 starts rotation. At this point, the speed of the sun gear S is increased. After that, control of the travel control device proceeds to Step S209, and the control same as above is executed.

Meanwhile, in the control flow illustrated in FIG. 7, Step S206 is the step to determine the transmission gear ratio after returning, and a step to engage the engagement element to form the transmission gear ratio after returning may be executed before Step S209 based on the determination result.

Second Embodiment

Figure 9:
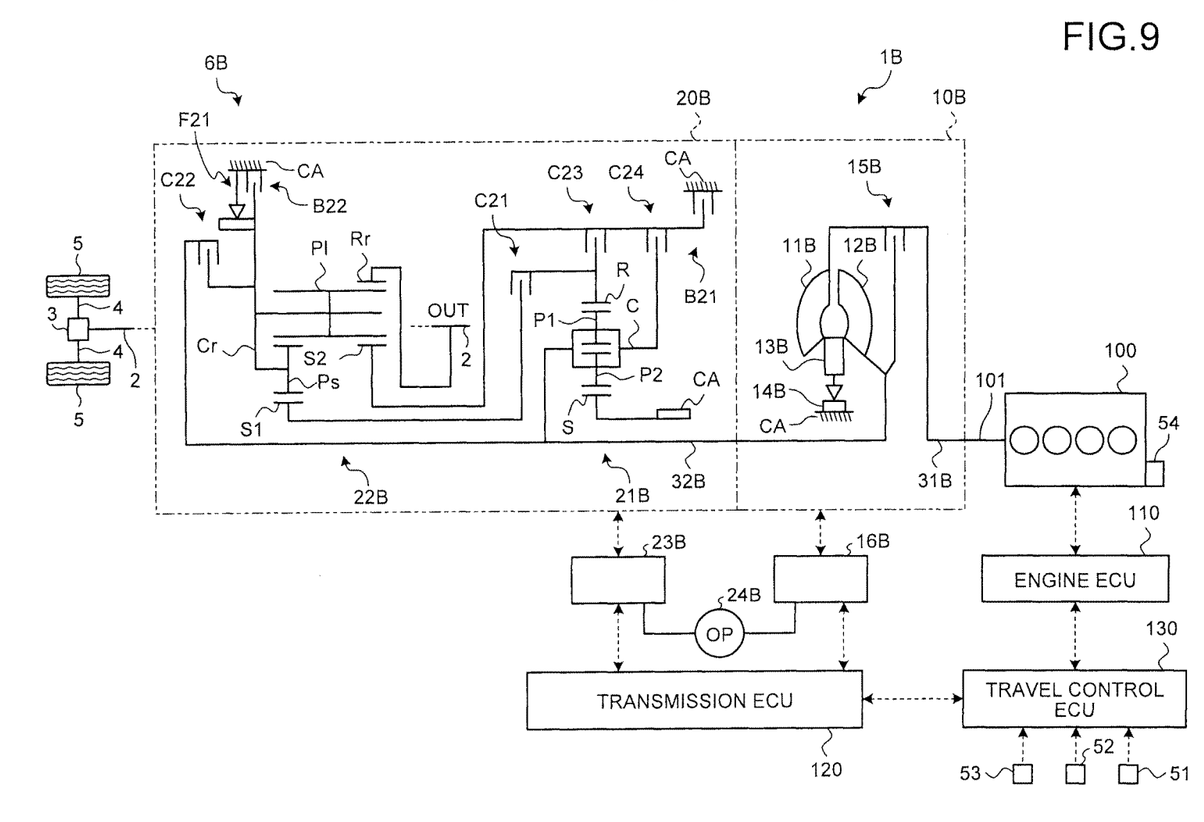
FIG. 9 is a schematic configuration diagram of a vehicle mounted with a travel control device according to a second embodiment.

FIG. 9 is a schematic configuration diagram of a vehicle mounted with a travel control device according to a second embodiment. As illustrated in FIG. 9, a vehicle 1B includes an engine 100, an output shaft 2, a differential gear 3, right and left drive shafts 4, right and left drive wheels 5, an automatic transmission 6B, an engine ECU 110, a transmission ECU 120, a travel control ECU 130, hydraulic actuators 16B, 23B, an oil pump 24B, a vehicle speed sensor 51, an accelerator position sensor 52, a brake sensor 53, and a crank angle sensor 54. In the following, a description for components denoted by references sings same as a vehicle 1A will be appropriately omitted.

The automatic transmission 6B is an automatic transmission provided with 8-speed forward, and includes a torque converter 10B and a transmission body 20B.

The torque converter 10B includes a pump impeller 11B, a turbine runner 12B, and a stator 13B housed inside a housing CA of the automatic transmission 6B, and transmits output torque of the engine 100 to the transmission body 20B. The pump impeller 11B is connected to an input shaft 31B of the automatic transmission 6B so as to be integrally rotatable. The input shaft 31B is connected to the output shaft 101 of the engine 100. The turbine runner 12B is connected to an intermediate shaft 32B so as to be integrally rotatable. The turbine runner 12B is connected to the transmission body 20B via the intermediate shaft 32B. The stator 13B is connected to the housing CA via a one-way clutch 14B.

A lock-up clutch 15B is disposed in the torque converter 10B. The lock-up clutch 15B is a hydraulically-driven engagement element including a first engagement portion capable of rotating integrally with the input shaft 31B, and a second engagement portion capable of rotating integrally with the intermediate shaft 32B. The lock-up clutch 15B rotates the pump impeller 11B integrally with the turbine runner 12B when engaged.

The transmission body 20B is formed by including a first planetary unit 21B, a second planetary unit 22B, and a plurality of engagement elements inside a housing CA. The plurality of engagement elements includes a first clutch C21, a second clutch C22, a third clutch C23, a fourth clutch C24, a first brake B21, and a second brake B22. The transmission body 20B can execute switching and setting to a requested transmission gear ratio by engaging or disengaging the engagement elements in accordance with the requested transmission gear ratio between the input and output. Note that the transmission body 20B also includes a one-way clutch F21.

The first planetary unit 21B is a double-pinion type planetary gear train and includes, as a plurality of rotary elements capable of differential rotation, a sun gear S, a ring gear R, a plurality of first pinion gears P1, a plurality of second pinion gears P2, and a carrier C. The second planetary unit 22B is a Ravigneaux-type planetary gear train same as the second planetary unit 22A in FIG. 1 and includes, as a plurality of rotary elements capable of differential rotation, a first sun gear S1, a second sun gear S2, a ring gear Rr, a plurality of long pinion gears Pl, a plurality of short pinion gears Ps, and a carrier Cr. In the transmission body 20B, the carrier C of the first planetary unit 21B and the first sun gear S1 of the second planetary unit 22B are connected so as to be integrally rotatable. The torque received in the automatic transmission 6B is output from the carrier Cr of the second planetary unit 22B and transmitted to the right and left drive wheels 5 via the output shaft 2, differential gear 3, and right and left drive shafts 4.

The first clutch C21 includes a first engagement portion capable of rotating integrally with the first sun gear S1 of the second planetary unit 22B, and a second engagement portion capable of rotating integrally with the ring gear R of the first planetary unit 21B. More specifically, the first clutch C21 is a frictional engagement device in which a friction material is included in one of the first engagement portion and the second engagement portion, and engagement operation and disengagement operation between the first engagement portion and the second engagement portion is hydraulically controlled. The second clutch C22 is a frictional engagement device same as the first clutch C21. The second clutch C22 includes a first engagement portion capable of rotating integrally with the carrier Cr of the second planetary unit 22B, and a second engagement portion capable of rotating integrally with the intermediate shaft 32B and the carrier C of the first planetary unit 21B. The third clutch C23 includes a first engagement portion capable of rotating integrally with the ring gear R of the first planetary unit 21B and the second engagement portion of the first clutch C21, and a second engagement portion capable of rotating integrally with the second sun gear S2 of the second planetary unit 22B. The fourth clutch C24 includes a first engagement portion capable of rotating integrally with the carrier C of the first planetary unit 21B, and a second engagement portion capable of rotating integrally with the second sun gear S2 of the second planetary unit 22B and the second engagement portion of the third clutch C23.

The first brake B21 and second brake B22 are hydraulically-driven frictional engagement devices same as the first clutch C21 and the like. The first brake B21 includes a first engagement portion capable of rotating integrally with the second sun gear S2 of the second planetary unit 22B, and a second engagement portion fixed to the housing CA. Therefore, the first engagement portion can integrally rotate with the second engagement portion in each of the third clutch C23 and the fourth clutch C24. The second brake B22 includes a first engagement portion capable of rotating integrally with the carrier Cr of the second planetary unit 22B, and a second engagement portion fixed to the housing CA. The one-way clutch F21 brings the carrier Cr of the second planetary unit 22B in a rotation stopped state or a rotatable state.

Figure 10A:
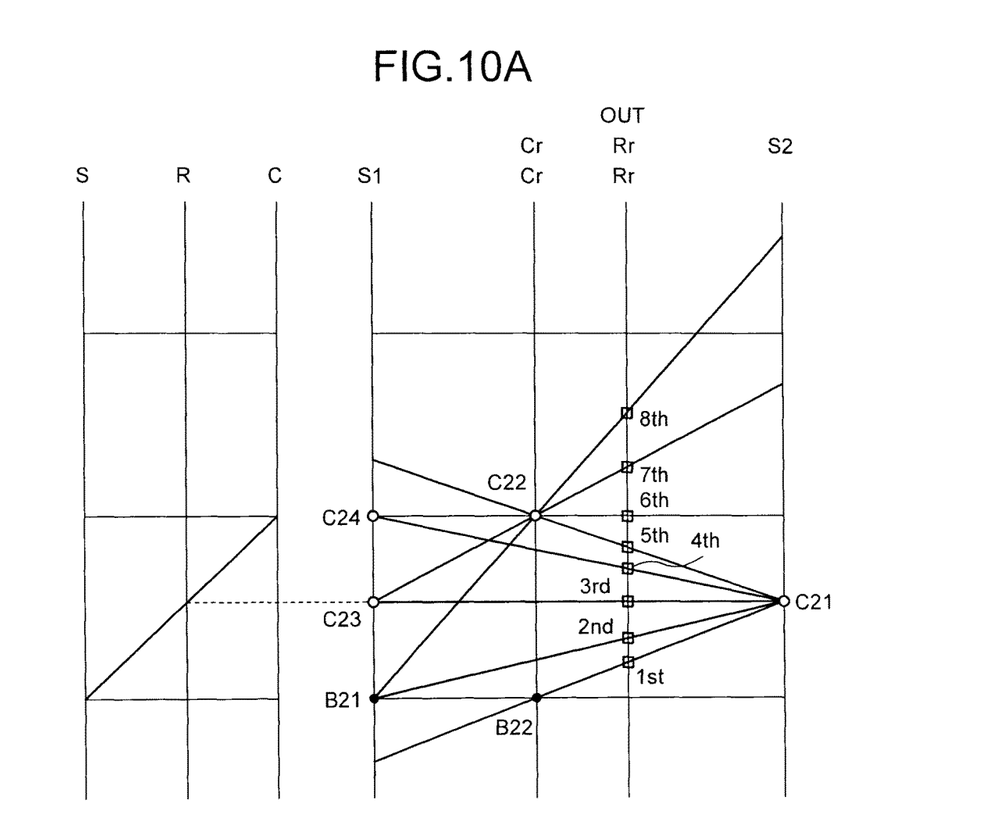
FIGS. 10A and 10B are diagrams illustrating a collinear chart per variable speed range of an automatic transmission and an operative engagement table.
Figure 10B:
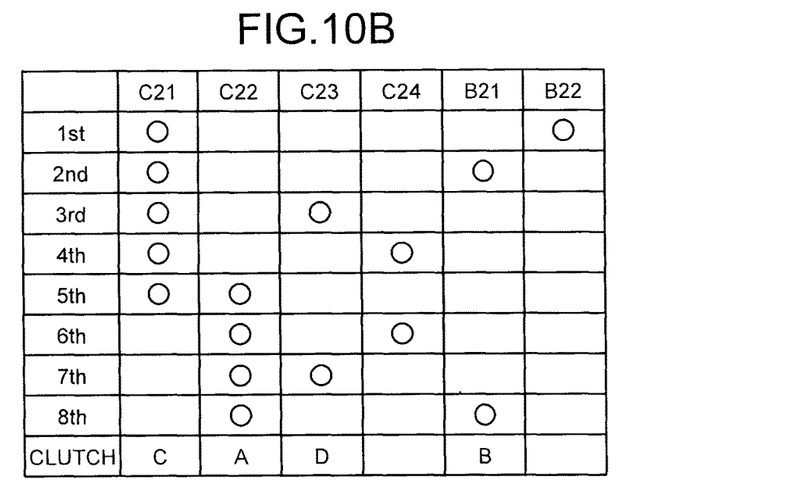

FIG. 10A is a collinear chart (speed diagram) per variable speed range of the automatic transmission 6B, and FIG. 10B is an operative engagement table per variable speed range of the first clutch C21, second clutch C22, third clutch C23, fourth clutch C24, first brake B21, and second brake B22. In the operative engagement table, a circle indicates an engaged state, and a blank indicates a disengaged state. Further, "1st", "2nd", "3rd", "4th", "5th", "6th", "7th", and "8th" respectively represent transmission gear ratios from 1st gear range to 8th gear range in a forward range D. For example, when the transmission gear ratio is 1st gear range, the first clutch C21 and the second brake B22 are respectively engaged. Further, for the sake of convenience in the later description, the second clutch C22 may be referred to as a clutch A, the first brake B21 as a clutch B, first clutch C21 as a clutch C, and the third clutch C23 as a clutch D as illustrated in the operative engagement table of FIG. 10B.

The description returns to FIG. 9. The hydraulic actuator 16B is hydraulically operated, and controls engagement operation and disengagement operation of the lock-up clutch 15B. A hydraulic actuator 23B is hydraulically operated, and controls engagement operation and disengagement operation of the first clutch C21, second clutch C22, third clutch C23, fourth clutch C24, first brake B21, and second brake B22. The oil pump 24B supplies hydraulic oil with hydraulic pressure to actuate the hydraulic actuators 16B, 23B. Power of oil pump 24B is supplied to an electric motor to be driven by rotative force of the engine 100 or by a battery. The electric motor is mainly used when the engine 100 is stopped.

The transmission ECU 120 outputs a control signal to the hydraulic actuators 16B, 23B based on detection results of vehicle speed and an accelerator position. The hydraulic actuator 16B, 23B control the automatic transmission 6B based on the control signal. The speed of the automatic transmission 6B is varied by this.

The travel control ECU 130 controls a travel mode of the vehicle 1B. In the second embodiment, the travel control ECU 130 is configured to execute free-running as the travel mode. For example, when the accelerator is turned off during travel and also the brake is off, the travel control ECU 130 outputs a control signal to perform the free-running, and blocks power transmission between the engine 100 and the drive wheel 5, and further stops the engine 100. The vehicle 1B thus performs coasting travel. A travel control device according to the second embodiment is implemented by a configuration including the travel control ECU 130, or including the engine ECU 110, transmission ECU 120, and travel control ECU 130.

In the second embodiment also, same as the first embodiment, the travel control device causes the vehicle 1B to perform the free-running during traveling at a predetermined transmission gear ratio, and further engages at least one of the engagement elements excluding an engagement element to be engaged at the predetermined transmission gear ratio in a state that all of the engagement elements to be engaged at the predetermined transmission gear ratio are disengaged during the free-running, thereby increasing speed of the rotary element inside the automatic transmission 6B. Further, at the time of returning from the free-running, the travel control device disengages the engagement element being engaged, and further engages an engagement element to transmit, to the engine 100, rotational energy of the rotary element having the increased speed out of the engagement elements to be engaged at the transmission gear ratio after returning from the free-running. After that, when the speed of the engine 100 becomes higher than a predetermined speed, the engine 100 is started. Occurrence of deceleration caused by push-starting during the free-running can be thus prevented.

An example of control according to the second embodiment can be represented by using a time chart illustrated in FIG. 3 and a control flowchart illustrated in FIG. 4. A different example of control according to the second embodiment can be represented by using a time chart illustrated in FIG. 6 and a control flowchart illustrated in FIG. 7. At this point, the time charts illustrated in FIGS. 3 and 6 and the control flowcharts in FIGS. 4 and 7 correspond to an example in which the accelerator is turned off while the vehicle 1B travels in 8th gear range and the travel mode shifts to the free-running. Further, 5th gear range in FIGS. 3, 4, 6, 7 and the description therefor corresponds to 7th gear range in the case of the second embodiment. Also, as described in FIGS. 10A and 10B, the clutch A is the second clutch C22, the clutch B is the first brake B21, the clutch C is the first clutch C21, and the clutch D is the third clutch C23.

There is an effect that occurrence of deceleration caused by push-starting during the free-running can be prevented.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A travel control device, comprising:
   an engine;
   an automatic transmission including a plurality of engagement elements and a rotary element, the automatic transmission being configured to block power transmission between the engine and a drive wheel of a vehicle and set a transmission gear ratio; and
   a controller configured to:
      perform free-running by blocking power transmission between the engine and the drive wheel while traveling at a predetermined transmission gear ratio and stopping the engine, by disengaging a set of engagement elements of the plurality of engagement elements that are engaged to effect the predetermined transmission gear ratio;
      increase speed of the rotary element during the free-running, by engaging a first engaged element of the plurality of engagement elements that is not one of the set of engagement elements;
      disengage, at a time of returning from the free-running, the first engaged element;
      engage a second engagement element of the plurality of engagement elements to transmit to the engine rotational energy of the rotary element having the increased speed, the second engagement element being at least one of the plurality of engagement elements engaged to effect the transmission gear ratio after returning from the free-running; and
      start the engine at a time speed of the engine becomes higher than a predetermined speed.

2. The travel control device according to claim 1, wherein the second engagement element of the plurality of engagement elements engaged at the time of returning from the free-running is connected to the engine.

* * * * *